Patented July 15, 1924.

1,501,865

UNITED STATES PATENT OFFICE.

OTTO REITMAIR, OF LANG ENZERSDORF, NEAR VIENNA, AUSTRIA.

PROCESS OF INCREASING THE FINENESS OF GROUND CARBONATE-CONTAINING MINERALS.

No Drawing.   Application filed October 30, 1923. Serial No. 671,794.

*To all whom it may concern:*

Be it known that I, OTTO REITMAIR, residing at Lang Enzersdorf, near Vienna, Austria, have invented certain new and useful Improvements in a Process of Increasing the Fineness of Ground Carbonate-Containing Minerals, for which I have filed application for patent in Germany, May 24, 1922, and Austria, October 15, 1922, and of which the following is a specification.

Many technical uses require a very thorough comminution and an extreme fineness of material which has heretofore generally been produced by various methods, usually by long continued rubbing and washing, but always by mechanical means. The working up of mineral pigments into commercial products may serve as an example, these latter are either put up for use directly in painting in a finely pulverized form so that the user makes his own paint mixture or they may be manufactured in the same factory into varnishes of various kinds, enamels, paints, pastes, or other well known mixtures by mixing the finely powdered substances with liquids. In this latter case the mechanical comminution forms an important preliminary operation. A guarantee of a definite degree of fineness in the commercial product is hitherto unknown and not customary.

The inventor started out with the realization gathered from his own studies that in the case of many kinds of minerals or rocks which contain various elemental substances in molecular combination, such as carbonates, oxides, hydrates, hydrosilicates, silicates, phosphates or fluorides, the chemical action for example of limited amounts of dilute acids or acid salt solutions on the more or less finely ground raw materials results in a very far reaching dispersion of a part of the elemental substances due to the fact that the most easily attacked substances are first dissolved out of the aggregate whereby the more difficulty attacked substances are torn out of the original mineral structure in the form of a very fine division. The carbonates of calcium and magnesium are more easily attacked than the oxides and hydroxides of iron and aluminum or the phosphates and silicates where only sufficient amounts of acid are used to bring about a transformation of the carbonates into hydrated carbonates, It is therefore possible in the case of rock flours containing carbonates of calcium and magnesium, hydroxides and oxides of iron and aluminum, phosphates and silicates, considerable dispersion can be produced in a rapid simple and cheap manner by using an amount of acid which will exactly suffice for the decomposition of the carbonates in the charge, by converting them into bicarbonates without affecting the less readily attackable substances.

The action of acid in the proper dilution can take place in the gaseous as well as in the liquid phase. It is commercially advantageous to attempt to produce conditions which yield the product in a degree of dispersion in the dry form. The fine particles are then present in the product in the form of aggregates. In this form the product is the most conveniently and cheaply transported and is useful for various purposes and can be directly mixed or ground or rubbed up with oily as well as aqueous, alcoholic, and other liquids.

In general, by means of the new process the degree of dispersion of the raw material which has been brought to the highest degree of fineness by the ordinary grinding means or the finest particles which are separated by simply sieving without washing can be increased to ten to fifty times that of the starting material. In particular cases a fineness of one thousandth of a millimeter is reached. The most favorable cases for the utilization of the process are those in which the mineral raw materials show a somewhat higher or not too low lime content with a very small magnesia content. It is preferable that carbonates be present corresponding to at least about 3% $CO_2$ (say at least 7% $CaCO_3$) in the starting material. Then it is possible to use dilute sulphuric acid or acid sulfates for the chemical action and to calculate the concentrations so that on the one hand a complete and homogeneous mixture of the raw materials is eaily achieved and on the other hand the main part of the water present in the components of the mixture is combined with the calcium sulfate formed in the first stages of the process. In this case an easily transportable product is directly produced in a dry form and can be mixed with various liquids without complicated preparations. If the complete combination of the water is not achieved by means of the gypsum formed in the mixture the mixed products will be produced in the form of a paste of higher water content and are then only adapted for direct mixture with aqueous liquids.

Example.

200 kg. of finely sieved ochre containing about ten percent of calcium carbonate, is thoroughly mixed for several minutes with 46 kg. sulfuric acid of 20° Bé. in a suitable mixing apparatus and the mixture produced is emptied from the mixing apparatus and brought to a storage pile.

The product is directly transportable and easily rubbed up, and therefore ready for use. The same can also be divided into portions of various degrees of fineness by subsequent washing operations.

I claim:

1. A process of increasing the degree of fineness of ground carbonate containing minerals, which comprises thoroughly mixing the ground mineral containing at least 3% of combined carbonic acid, with a diluted mineral acid in such proportions that essentially only the carbonates are decomposed.

2. A process of increasing the degree of dispersion of ground carbonate-containing minerals, consisting in thoroughly mixing the ground mineral containing at least 3% of combined carbonic acid with an acid salt-solution in such proportions that practically only the carbonates are decomposed.

3. A process of increasing the degree of fineness of ground carbonate-containing minerals, consisting in thoroughly mixing the ground mineral containing at least 3% of combined carbonic acid with a mixture comprising a diluted mineral acid and an acid salt-solution, so that essentially only the carbonates are decomposed.

4. A process of increasing the degree of fineness of ground carbonate-containing minerals, containing a higher percentage of calcium than of magnesium, consisting in thoroughly mixing the ground mineral containing at least 3% of combined carbonic acid with a diluted mineral acid solution containing the sulphate radical, in order to chemically form the amount of sulphate of lime necessary for drying the final product.

5. A process of increasing the degree of fineness of ground carbonate-containing minerals, containing a higher percentage of calcium than of magnesium which comprises thoroughly mixing the ground mineral containing at least 3% of combined carbonic acid with an acid salt-solution containing a sulphate, in order to chemically form the amount of sulphate of lime necessary for taking up the water, to have a dry-appearing product.

In testimony whereof I affix my signature in presence of two witnesses.

OTTO REITMAIR.

Witnesses:
 ING. RUDOLF THEUMER,
 ING. VICTOR ENO.